(12) United States Patent
Amon et al.

(10) Patent No.: US 8,428,140 B2
(45) Date of Patent: Apr. 23, 2013

(54) CODING AND DECODING METHOD AND DEVICE

(75) Inventors: Peter Amon, Vaterstetten (DE); Andreas Hutter, München (DE); Benoit Timmermann, Zorneding (DE)

(73) Assignee: Siemens Aktiengesellschaft, Munich (DE)

( * ) Notice: Subject to any disclaimer, the term of this patent is extended or adjusted under 35 U.S.C. 154(b) by 1270 days.

(21) Appl. No.: 11/659,211

(22) PCT Filed: Jul. 27, 2005

(86) PCT No.: PCT/EP2005/053675
§ 371 (c)(1),
(2), (4) Date: Sep. 20, 2007

(87) PCT Pub. No.: WO2006/015947
PCT Pub. Date: Feb. 16, 2006

(65) Prior Publication Data
US 2008/0292002 A1    Nov. 27, 2008

(30) Foreign Application Priority Data
Aug. 5, 2004  (DE) .......................... 10 2004 038 110

(51) Int. Cl.
*H04N 7/12* (2006.01)

(52) U.S. Cl.
USPC ............ 375/240.24; 375/240.17; 375/240.25; 375/240.26; 348/445; 348/565; 348/584

(58) Field of Classification Search ............. 375/240.17, 375/240.24, 240.25, 240.26; 348/445, 565, 348/584
See application file for complete search history.

(56) References Cited

U.S. PATENT DOCUMENTS 5,107,345 A * 4/1992 Lee ................................ 382/250
5,253,058 A * 10/1993 Gharavi .................... 375/240.12
(Continued)

FOREIGN PATENT DOCUMENTS
KR   2004-0046892   6/2004
WO   97/17797      5/1997

OTHER PUBLICATIONS

J. Xu et al., "3D Subband Video Coding Using Barbell Lifting", ISO/IEC JTC1/SC29/WG11 MPEG2005/M10569/S05, Mar. 2004, 14 pp.
(Continued)

*Primary Examiner* — Andrew Lai
*Assistant Examiner* — Andrew C Lee
(74) *Attorney, Agent, or Firm* — Staas & Halsey LLP

(57) ABSTRACT

In a method for the video coding of image sequences images in the image sequence are coded in a scaled manner, in such a way that the video data produced contains information which permits the images to be represented in a plurality of differing stages of image resolution, the latter being defined by the number of pixels per image representation. The coding is block-based, in such a way that to describe a displacement of parts of one of the images, said displacement being contained in the image sequence, at least one block structure that describes the displacement is created. Said block structure is configured from one block, which is subdivided into sub-blocks, whereby some of the sub-blocks are further subdivided into successively smaller sub-blocks. A first block structure is temporarily created for at least one first resolution stage and a second block structure is created for a second resolution stage, the first resolution stage having a lower number of pixels than the second resolution stage. In addition, the second block structure is compared with the first block structure to determine the differences in structure, in order to create a modified second block structure on the basis of characteristics of the structural differences, said modified block structure representing part of the second block structure and forming the basis for the coding of the image sequence.

11 Claims, 4 Drawing Sheets

U.S. PATENT DOCUMENTS

| | | | | |
|---|---|---|---|---|
| 5,414,469 A * | 5/1995 | Gonzales et al. | | 375/240.18 |
| 5,486,863 A * | 1/1996 | Auyeung et al. | | 375/240.24 |
| 5,715,005 A * | 2/1998 | Masaki | | 375/240.16 |
| 6,078,617 A * | 6/2000 | Nakagawa et al. | | 375/240 |
| 6,115,070 A * | 9/2000 | Song et al. | | 375/240.12 |
| 6,175,593 B1 * | 1/2001 | Kim et al. | | 375/240.17 |
| 6,192,079 B1 * | 2/2001 | Sharma et al. | | 375/240.16 |
| 6,310,921 B1 * | 10/2001 | Yoshioka et al. | | 375/240.26 |
| 6,343,098 B1 * | 1/2002 | Boyce | | 375/240.03 |
| 6,392,705 B1 * | 5/2002 | Chaddha | | 348/388.1 |
| 6,421,466 B1 * | 7/2002 | Lin | | 382/236 |
| 6,560,280 B1 * | 5/2003 | Shachar et al. | | 375/240 |
| 6,574,274 B2 * | 6/2003 | Obata et al. | | 375/240.03 |
| 6,614,442 B1 * | 9/2003 | Ouyang et al. | | 345/545 |
| 6,614,845 B1 * | 9/2003 | Azadegan | | 375/240.13 |
| 6,671,320 B1 * | 12/2003 | Beacken et al. | | 375/240.16 |
| 6,704,358 B1 * | 3/2004 | Li et al. | | 375/240.02 |
| 6,937,659 B1 * | 8/2005 | Nguyen et al. | | 375/240.19 |
| 6,944,226 B1 * | 9/2005 | Lin et al. | | 375/240.2 |
| 6,963,606 B1 * | 11/2005 | Yanagihara et al. | | 375/240.01 |
| 6,990,241 B2 * | 1/2006 | Natarajan et al. | | 382/233 |
| 7,020,201 B2 * | 3/2006 | Luo et al. | | 375/240.16 |
| 7,027,512 B2 * | 4/2006 | Jeon | | 375/240.16 |
| 7,203,237 B2 * | 4/2007 | Fernandes | | 375/240.16 |
| 7,260,148 B2 * | 8/2007 | Sohm | | 375/240.16 |
| 7,330,509 B2 * | 2/2008 | Lu et al. | | 375/240.03 |
| 7,471,725 B2 * | 12/2008 | Linzer et al. | | 375/240.16 |
| 7,532,808 B2 * | 5/2009 | Lainema | | 386/328 |
| 7,643,559 B2 * | 1/2010 | Kato et al. | | 375/240.23 |
| 2002/0009145 A1 * | 1/2002 | Natarajan et al. | | 375/240.21 |
| 2002/0071485 A1 * | 6/2002 | Caglar et al. | | 375/240.01 |
| 2002/0154697 A1 | 10/2002 | Jeon | | |
| 2003/0174770 A1 * | 9/2003 | Kato et al. | | 375/240.2 |
| 2004/0184542 A1 * | 9/2004 | Fujimoto | | 375/240.16 |
| 2004/0213468 A1 * | 10/2004 | Lee et al. | | 382/236 |
| 2004/0234143 A1 * | 11/2004 | Hagai et al. | | 382/238 |
| 2004/0258154 A1 * | 12/2004 | Liu et al. | | 375/240.16 |
| 2005/0047504 A1 * | 3/2005 | Sung et al. | | 375/240.2 |
| 2005/0057523 A1 * | 3/2005 | Moyer | | 345/173 |
| 2005/0058197 A1 * | 3/2005 | Lu et al. | | 375/240.03 |
| 2005/0063465 A1 * | 3/2005 | Cote et al. | | 375/240.12 |
| 2005/0129129 A1 * | 6/2005 | Winger et al. | | 375/240.24 |
| 2005/0135484 A1 * | 6/2005 | Lee et al. | | 375/240.16 |
| 2005/0195900 A1 * | 9/2005 | Han | | 375/240.21 |
| 2005/0207663 A1 * | 9/2005 | Zeng et al. | | 382/236 |
| 2006/0002474 A1 * | 1/2006 | Au et al. | | 375/240.16 |
| 2006/0013303 A1 * | 1/2006 | Nguyen et al. | | 375/240.11 |
| 2006/0146933 A1 * | 7/2006 | Lu et al. | | 375/240.12 |

OTHER PUBLICATIONS

"Advanced Video Coding for Generic Audiovisual Services," ITU-T Recommendation H.264—ISO/IEC 14496-10 AVC, 2003, pp. 1-11.

Zhang et al., "Adaptive Quadtree Coding of Motion-Compensated Image Sequences for Use on the Broadband ISDN", IEEE Transactions on Circuits and Systems for Video Technology, vol. 3, No. 3, Jun. 1993, pp. 222-229.

J.R. Ohm, Digitale Bildcodierung, Springer Verlag, Berlin, 1995, pp. 334, 335 and 406-408.

Tambanker et al., "An Overview of H.264/MPEG-4 Part 10," 4th EURASIP Conference focused on Video/Image Processing and Multimedia Communications, IEEE, 2003, pp. 1-51.

Korean Notice of Allowance for related Korean Patent Application No. 10-2007-7002042, issued on Sep. 25, 2012.

* cited by examiner

ME: Motion estimation
CIF: 352x288 pixel
QCIF: 176x144 pixel

MC directional modes

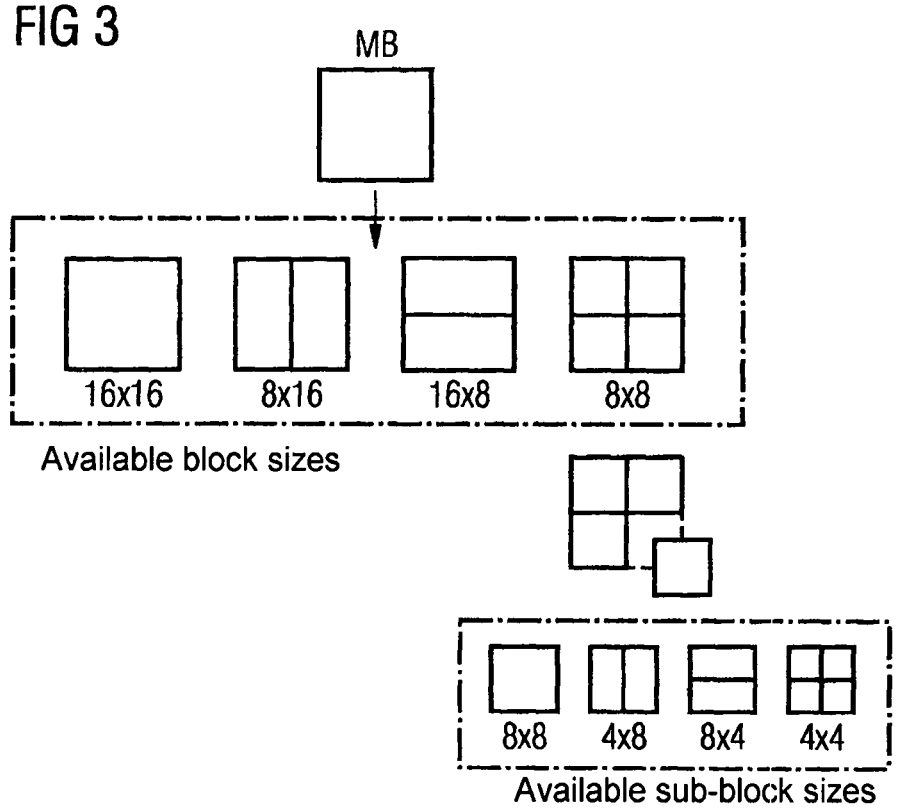

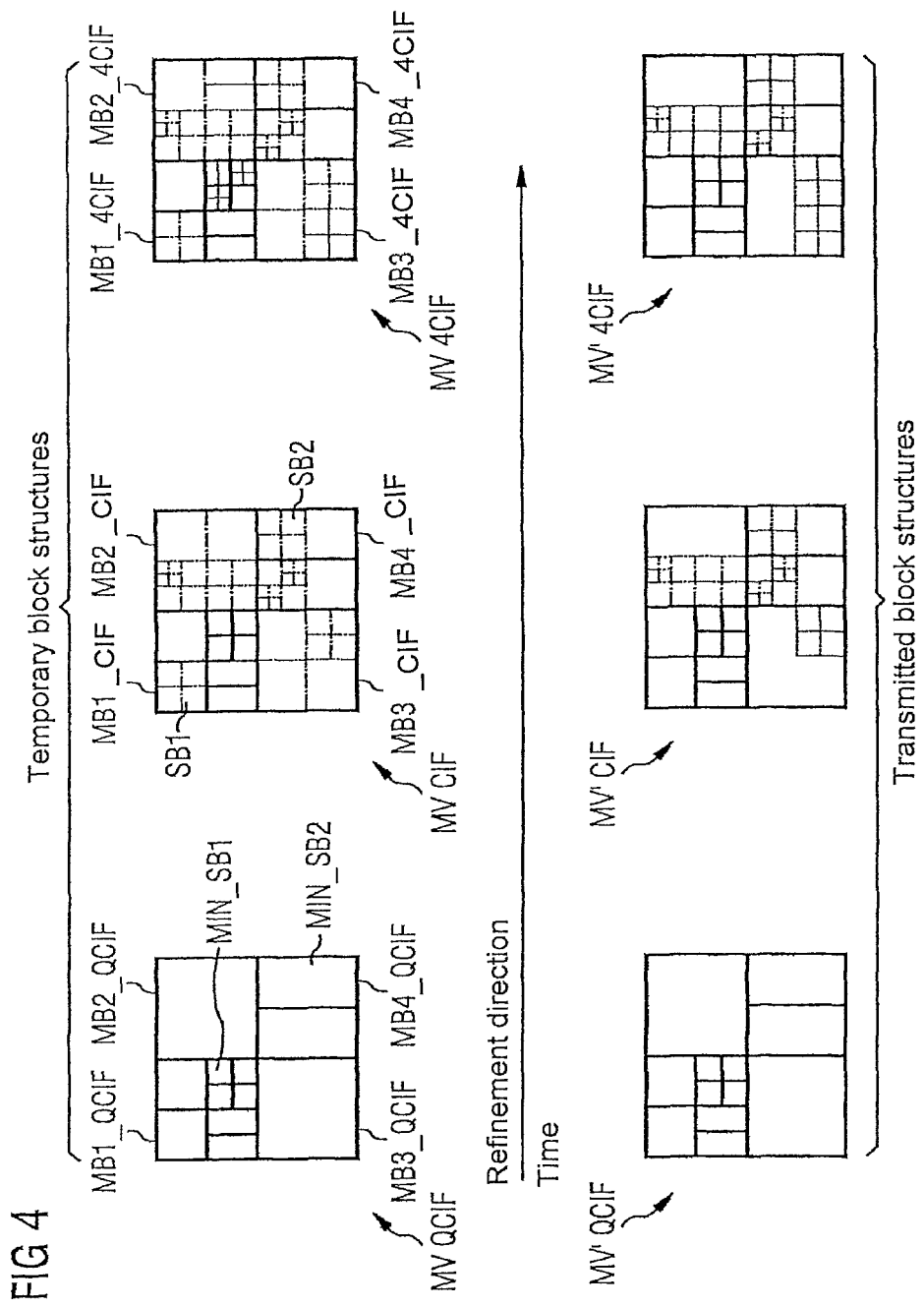

CODING AND DECODING METHOD AND DEVICE

CROSS REFERENCE TO RELATED APPLICATIONS

This application is based on and hereby claims priority to Application No. PCT/EP2005/053675 filed Jul. 27, 2005 and German Application No. 10 2004 038 110.0 filed on Aug. 5, 2004, the contents of which are hereby incorporated by reference.

BACKGROUND

The invention relates to a method for video coding, a method for decoding as well as an encoder for video coding and a decoding device.

Digital video data is generally compressed for storage or transmission in order to significantly reduce the enormous data volume, compression being performed both by eliminating the signal redundancy contained in the video data and by removing the irrelevant signal portions not perceptible to the human eye. This is generally achieved by a hybrid encoding method whereby the image to be encoded is first time-predicted and the remaining prediction error is then transformed e.g. by a discrete cosine transformation to the frequency domain where it is quantized and encoded using a variable length code. The motion information and the quantized spectral coefficients are finally transmitted.

The better the prediction of the next image information to be transmitted, the smaller the prediction error remaining after prediction and the lower the data rate then required for encoding this error. An object of video data compression is therefore to obtain an optimally precise prediction of the image to be encoded from the image information already transmitted.

Image prediction has hitherto been performed by first subdividing the image e.g. into regular sections, typically square blocks of 8×8 or 16×16 pixels, and then determining a prediction for each of these blocks from the image information already known in the receiver by motion compensation. (However, blocks of different size can also be produced.) Such a procedure is illustrated in FIG. 1. A distinction can be drawn here between two basic prediction cases:

Unidirectional prediction: here motion compensation is performed solely on the basis of the previously transmitted image and results in so-called "P-frames".

Bidirectional prediction: image prediction is performed by superimposing two images, one of which is a past image and the other a future image, resulting in so-called "B-frames". It should be noted that the two reference images have already been transmitted.

According to these two possible prediction cases, motion-compensated temporal filtering (MTCF) yields five directional modes in the MSRA method Jizheng Xu, Ruigin Xiong, Bo Feng, Gary Sullivan, MingChieh Lee, Feng Wu, Shipeng Li, "3D subband video coding using Barbell lifting", ISO/IEC JTC1/SC29/WG11 MPEG 68th meeting, M10569/s05, Munich, March 2004, as illustrated in FIG. 2.

MCTF-based scalable video coding is used to ensure good video quality for a very wide range of possible bit rates. However, the currently known MCTF algorithms show unacceptable results for reduced bit rates due to the fact that too little texture (block information) is present in relation to information referring to the motion information (block structures and motion vectors) of a video defined by an image sequence. A scalable form of motion information is therefore required in order to achieve an optimum ratio between texture and motion data at any bit rate and also resolution. To this end, Jizheng Xu, Ruigin Xiong, Bo Feng, Gary Sullivan, MingChieh Lee, Feng Wu, Shipeng Li, "3D subband video coding using Barbell lifting", ISO/IEC JTC1/SC29/WG11 MPEG 68th meeting, M10569/s05, Munich, March 2004. discloses a solution from MSRA (Microsoft Research Asia) which represents the current state of MCTF algorithms.

The MSRA solution proposes to represent motion using layering, or resolve it in successively refined structures. The MSRA method succeeds in generally improving image quality at low bit rates.

However, this solution has the disadvantage that it results in a plurality of shifts in the reconstructed image due to a mismatch between motion information and texture.

SUMMARY

One potential object is to specify a method for encoding and decoding, as well as an encoder and decoder which ensure improved video coding.

The inventors propose a method for the video coding of image sequences in which images of the image sequence are encoded in a scaled manner in such a way that the resulting image data contains information which ensures representation of the images in a plurality of different levels of image resolution defined by the number of pixels per image representation, the encoding being performed in a block-based manner in such a way that for describing any motion of parts of one of the images, said motion contained in the image sequence, at least one block structure describing the motion is generated which is implemented in such a way that it is subdivided, starting from one block, into partial blocks, some of which are subdivided into successively finer sub-blocks. According to this method a first block structure is produced for at least one first resolution level and a second block structure is produced for a second resolution level, the first resolution level having a smaller number of pixels than the second resolution level. In addition, the second block structure is compared with the first block structure in such a way that differences in the block structure are determined so that, based on characteristics of the structural differences, a modified second block structure is produced in such a way that its structure constitutes a subset of the second block structure so that the modified second block structure is then used as the basis for encoding the image sequence.

This procedure minimizes the texture information difference, this information also being encodable with minimal complexity. Also eliminated is the mismatch for the cases where the coarsest motion vector field has been selected, thereby ensuring improved image quality even at lower bit rates and lower resolutions.

For this purpose, added sub-blocks are preferably detected for determining differences, the characteristics of the sub-blocks being detected alternatively or additionally to the difference determinations.

If the block size of the sub-blocks is detected as the sub-block characteristic, an in practice very good indicator of the degree of fineness of the block structures created is obtained.

If only the partial block of the first block structure corresponding to the partial block of the second block structure is used for difference determination, the texture information differences can be reduced still further.

In this case preferably only the second block structure's sub-blocks whose block size attains a definable threshold are included in the modified second block structure. This means that a complete block structure, i.e. a complete motion vector field, does not need to be transmitted, but only the most significant part of the structure. This results on the one hand in a reduction in the information to be transmitted and also, in spite of this reduction, in an elimination or reduction of the mismatch so that artifacts in the encoded image are eliminated or reduced, the use of a definable threshold being particularly advantageous in practice, as optimum values determined e.g. by simulation or experimentation can be set here from which very good results are to be expected on the basis of the results of the simulation or experimentation.

The threshold is preferably defined in such a way that it specifies a ratio of the block size of a sub-block of the second block structure to a block size contained in a region of the first block structure used for comparison, said block size being assigned to the smallest sub-block of said region.

In a further development it is also provided to denote that the adopted sub-blocks can be non-dyadic.

A further improvement of the results in respect of the representation of the decoded image can be achieved if the modified second block structure of the second resolution level is used as the first block structure of a third resolution level, the second resolution level having a smaller number of pixels than the third resolution level. This means that, to produce the modified second block structure, possible further block structures of successively higher resolution levels are used for which the modified second block structure of the immediately preceding resolution level is used for the comparison.

Also advantageous for decoding is the fact that encoding is performed in such a way that sub-blocks not taken over into the second modified block structure are identified in each case.

For this purpose it is advantageously provided that identification takes place using a directional mode specifically designated as not refined.

The inventors also propose a method for decoding an encoded image sequence in which, after taking into account the second modified block structures contained in the image sequence which are produced according to the encoding method, a scalable representation of the image sequence is produced.

Also contributory to achieving said object is the proposed encoder which carries out the method and a corresponding decoder which decodes an encoded image sequence produced according to the method.

BRIEF DESCRIPTION OF THE DRAWINGS

These and other objects and advantages will become more apparent and more readily appreciated from the following description of the preferred embodiments, taken in conjunction with the accompanying drawings of which:

FIG. 3 shows the sub-block sizes used, FIG. 4 schematically illustrates block structures produced according to one potential embodiment of the invention.

DETAILED DESCRIPTION OF THE PREFERRED EMBODIMENT

Figure 1:
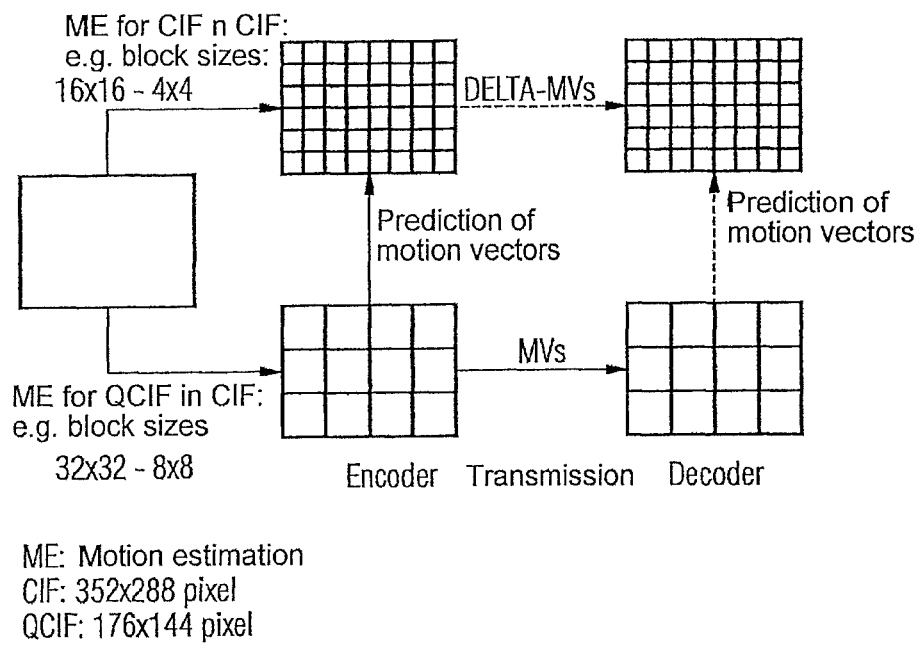
FIG. 1 shows a motion estimation model for generating scalable motion information.

Reference will now be made in detail to the preferred embodiments, examples of which are illustrated in the accompanying drawings, wherein like reference numerals refer to like elements throughout.

FIG. 1 schematically illustrates the related art MSRA solution which will be explained for the sake of better understanding of the proposed coding and decoding, as it is used at least in parts in the embodiment described.

According to MSRA, multilayer motion estimation is carried out in each temporary layer, said motion estimation being implemented for a fixed spatial resolution with different macroblock sizes so that the resulting motion vector field is adapted to the decoded resolution. For example, if the original resolution level is a CIF-encoded format and the decoded resolution level is in QCIF format, motion estimation is performed at the resolution level of the CIF format or CIF resolution, this taking place with a block size of 32×32 as the basis and with a macroblock size of 8×8 as the smallest block size. If, on the other hand, the decoded format is CIF, the size of the macroblocks is scaled down by a factor of 2 as shown in FIG. 1.

As FIG. 1 additionally shows, the original motion vectors are transmitted in the lower branch of the processing shown there for decoding the blocks present in QCIF format, whereas for each higher layer, e.g. the one used for decoding the CIF block, only the difference information in respect of the motion vectors is used. A single motion vector of a lower layer can be used here to predict a plurality of vectors of the higher layer when the block is split up into smaller partial blocks.

Figure 2:
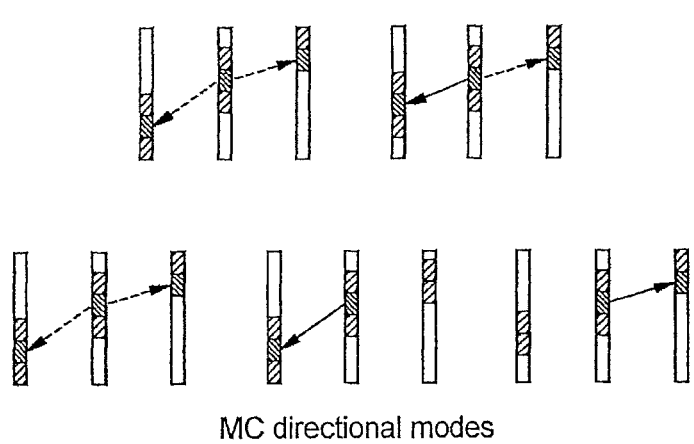
FIG. 2 shows the directional modes required for this purpose.

In this process, different modes indicate the direction of motion compensation, as already discussed and illustrated in FIG. 2, while FIG. 3 shows that the block structures according to the MSRA method are encoded according to the same method as that used in the MPEG-4 AVC (Advanced Video Coding) standard ITU-T and ISO/IEC JTC1, "Advanced Video Coding for Generic Audiovisual Services," ITU-T Recommendation H.264-ISO/IEC 14496-10 AVC, 2003.

In order to select the block structure and the direction of motion compensation that are to be encoded, according to the MSRA approach it is provided to use a so-called cost function which has been defined for this function and which is known as "rate distortion optimization".

In the multilayer representation of motion according to MSRA, different motion descriptors which are matched to various local resolutions are generated for the same temporary layer (frame rate), the motion estimation associated with the higher resolutions being regarded as enhancing information (enhancement layer/information), on the basis of detection of the coarse motion information. As the residual error block produced by the motion vector field contains a large amount of energy, only the residual error block created after the finest motion compensation is transmitted. Particularly if the coarse motion information is selected, this results in very strong artefacts in the reconstructed residual error image, this occurring even at high bit rates.

FIG. 4 shows how, using the proposed inventive method, temporary block structures created according to the proposed result in block structures which are finally to be transmitted.

Three temporary block structures MV_QCIF, MV_CIF and MV_4CIF are shown. Each of these block structures is assigned to a resolution level, the term resolution level denoting the format of the resolution with which a video signal having image sequences encoded according to the method can be represented.

For the present embodiment this format is common intermediate format (CIF), QCIF and 4CIF format.

Here QCIF constitutes a first resolution level, i.e. the lowest resolution level selected for the method, so that it is also assigned a first block structure MV_QCIF, whereas CIF constitutes a second resolution level for which a second block structure MV_CIF is created.

The block structures are created within the framework of a motion estimation algorithm, e.g. using the already mentioned MCTF and/or MSRA method.

It can also be seen that the temporary block structures MV_QCIF, MV_CIF and MV_4CIF have successively more refined sub-block structures wherein, starting from a temporary block structure MV_QCIF, MV_CIF and MV_4CIF, defined partial blocks MB1_QCIF . . . MB4_QCIF are further subdivided into ever finer sub-blocks.

Additionally illustrated is the fact that the temporary block structures MV_QCIF, MV_CIF and MV_4CIF have the same local resolution, this therefore remaining constant in spite of the number of pixels increasing from resolution level to resolution level.

FIG. 4 additionally shows the block structures MV_QCIF, MV_CIF and MV_4CIF to be transmitted or finally transmitted, e.g. for a streaming application, which are created using the method from the temporary block structures MV_QCIF, MV_CIF and MV_4CIF by comparing a block structure associated with a high resolution level with a block structure associated with a next lower resolution level to produce a modified block structure associated with the resolution level considered, said block structure having sub-block structures which contain only a subset of the temporary block structure associated with the same resolution level, this not being a proper subset which would exclude the case that the sub-block structure of the modified block structure is identical to the sub-block structure of the corresponding temporary block structure, but, as it is on the contrary even possible that this special case can also arise according to the method, merely being a (simple) subset known e.g. from mathematics.

This algorithm will now be explained in somewhat greater detail.

The method begins with creating a block structure associated with the lowest resolution level. From this first block structure MV_QCIF there is directly created the modified block structure MV_QCIF, since for this case no comparison with a previous block structure is possible. The directly resulting modified block structure MV_QCIF therefore has the same sub-block structure as that of the first block structure MV_QCIF.

In another step to the next higher resolution level, in this case CIF, a second block structure MV_CIF is created. Note that this second block structure MV_CIF has acquired additional sub-blocks resulting in a finer sub-block structure than that of the first block structure MV_QCIF, the sub-blocks or sub-block structures that have been added being represented with dash-dotted lines in the Figure.

In a next step a comparison is therefore performed in which the added sub-blocks are checked to ascertain whether they have a block size more than four times smaller than the smallest block size of the corresponding sub-region of the first block structure.

If this is the case, the corresponding sub-block structure is assumed in a modified second block structure MV_CIF, whereas in the cases where the sub-block under examination constitutes a lesser degree of refinement, the sub-block structure is not adopted in the modified second block structure to be transmitted.

To explain this better, in FIG. 4 two of the sub-blocks contained in the second block structure MV_CIF have been singled out by way of example, namely a first sub-block SB1 and a second sub-block SB2.

The first sub-block SB1 is in a first partial block MB1_CIF of the second block structure MV_CIF. Accordingly an examination is performed in a first partial block MB1_QCIF of the first block structure MV_QCIF corresponding to the first partial block MB1_CIF of the second block structure MV_CIF to ascertain which is the smallest sub-block size occurring here. In the present example this minimum block size is defined by a first minimum sub-block MIN_SB1. As can be seen, the size of the first sub-block corresponds to the size of the first minimum sub-block, so that in this case there is no refinement at all. The sub-block structure underlying the first sub-block is accordingly not adopted in the second block structure MV_CIF to be transmitted, so that in the second modified block structure MV_CIF shown in FIG. 4 the dash-dotted grid is absent at the corresponding location.

For the comparison, a second sub-block SB2 is also used, among other things, for the comparison. As the second sub-block SB2 is contained in a fourth partial block MB4_CIF of the second block structure MV_CIF, a minimum sub-block size is looked for in a fourth partial block MB4_QCIF of the first block structure MV_QCIF. This is given by a second minimum sub-block MIN_SB2 which in this case exactly divides the fourth partial block MB4_QCIF of the first block structure MV_QCIF. As can be seen, the size of the second sub-block SB2 in this case constitutes an eighth of the size of the minimum second sub-block MIN_SB2, so that even an eightfold refinement compared to the first block structure MV_QCIF is given. The sub-block structure defining the second sub-block is therefore also taken over into the modified second block structure MV'_CIF. The same happens for all the blocks of the second block structure MV_CIF as indicated in FIG. 4 by the dashed-line structures of the modified second block structure MV'_CIF.

As shown from a comparison of the second block structure MV_CIF and the modified second block structure MV'_CIF, not all the sub-block structures of the second block structure MV'_CIF have been taken over. In order that an image sequence encoded in this way can now be correctly represented, an identifier for the sub-blocks that have not been taken over into the modified block structures is included in the encoding of the block structures to be transmitted, the method also being used in the same way for further resolution levels. For example, according to the present embodiment a block structure MV_4CIF is likewise created for 4CIF format. This is now in turn used as a second block structure, while the first block structure is given by the previous second block structure MV_CIF, the second modified block structure MV'_4CIF resulting from comparison of the two block structures being in turn only refined by a portion of the added sub-block structures indicated by dotted lines in FIG. 4.

Alternatively or additionally, instead of a temporary block structure an already created transmitted, i.e. modified, second block structure can be used as the first block structure for the comparison.

It is not necessary to create block structures to be transmitted for all the resolution levels encoded in the image sequence, but e.g. only in the sub-resolutions of said resolutions, i.e. only, for example, for CIF in the case that QCIF, CIF or 4CIF has been applied or only for CIF, for the case that QCIF and CIF has been applied. On the contrary it is sufficient in practice to apply this to medium resolution levels compared to all the resolution levels present, as the best performance is provided at a medium resolution level, because multiple up and down sampling of the block structures and motion vectors can be avoided here. In this process the data rate for the motion information for the different local resolutions is set by a parameter in each case, resulting in an optimum ratio of the data rate for motion information and texture information at each resolution level.

The invention is not restricted to the example explained with reference to FIG. 4, but encompasses all implementations apparent to a person skilled in the art.

Not completely transmitting the, particularly according to MSRA, complete motion vector field created (temporary block structures MV_QCIF, MV_CIF and MV_4CIF) which is defined or present on the encoder side, but rather the most significant part of said motion vector field.

A significant advantage of the algorithm is the improvement in image quality even at low bit rates and also at low resolutions.

Figures 5A, 5B:
FIG. 5 shows the comparison of an image encoded according to one potential embodiment of the invention with an image encoded according to the related art.

This can be seen, for example, from the two images in FIG. 5, the image on the left showing a CIF format encoded image which was encoded at 15 Hz and 128 bps using the complete motion vector field known from the related art, while the image on the right, on the other hand, was encoded with the same format and identical bit rate but created [and] decoded using refinement methods compared to the previous image.

Comparison of the two images reveals that the (en)coded image has significantly fewer (coding) artefacts.

Thanks to the method these artefacts have been markedly reduced, as the mismatch between motion information and texture is therefore basically being limited, whereby only the part of the second motion vector field which differs most markedly or very markedly from the coarse motion vector field is refined.

This procedure must of course be communicated to a decoder decoding the data. For this purpose it is provided according to the algorithm to introduce a new direction mode which for example could be designated "not_refined". When the decoder now decodes this directional mode, the decoder knows that the motion vectors and block structure corresponding to the preceding motion estimation layer must be used, i.e. that according to the MSRA method, for example. Further refinement of the motion vectors is therefore not used in such a case.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for encoding video having an image sequence whereby images in the image sequence are encoded in a scaled manner such that resulting encoded video contains data which ensures representation of the images in a plurality of different levels of image resolution defined by a number of pixels per image representation, the method comprising:
    temporarily creating a second block structure for a second resolution level, whereby the second resolution level is higher than a first resolution level, the second block structure being created in a block-based manner by a process comprising:
    starting from one block, the block is subdivided into partial blocks and then sub-blocks;
    time-predicting the second block structure to produce a predicted block structure, the second block structure being time-predicted based on at least one other image in the image sequence;
    determining errors in the predicted block structure; and
    excluding from the second block structure information not relating to the errors in the predicted block structure;
    comparing the second block structure with a first block structure corresponding to the first resolution level, the first and second block structures being compared to:
        recognize further block structure divisions included the second block structure but not the first block structure; and
        determine the sizes of the further block structure divisions;
    creating a modified second block structure by eliminating from the second block structure all further block structure divisions larger than a predefined threshold value whereby the modified second block structure constitutes a subset of the second block structure; and
    using the modified second block structure to encode the image in the image sequence.

2. The method as claimed in claim 1, wherein the derived sub-blocks can be divided non-dyadically.

3. The method as claimed in claim 2, wherein the encoding is performed such that non-dyadically divided sub-blocks are identified.

4. The method as claimed in claim 1, wherein the encoding is performed such that sub-blocks not included in the second modified block structure are identified.

5. The method as claimed in claim 1, wherein identification is performed using a directional mode specifically designated as not refined.

6. The method as claimed in claim 1, wherein the predefined threshold is selected to control a ratio of motion information to texture information in the encoded video.

7. A method for encoding video having an image sequence whereby images in the image sequence are encoded in a scaled manner such that resulting encoded video contains data which ensures representation of the images in a plurality of different levels of image resolution defined by a number of pixels per image representation, the method comprising:
    temporarily creating a first block structure for a first resolution level and a second block structure for a second resolution level, whereby the first resolution level is lower than the second resolution level, the first and second block structures being created in a block-based manner such that, starting from one block, the block is subdivided into partial blocks and then sub-blocks to describe a motion possibility in the image sequence, the motion possibility being described by more finely subdividing areas of motion:
    comparing the first block structure with the second block structure to determine structural differences including motion and texture between the first and second block structures;
    creating a modified second block structure based on the structural differences, whereby the modified second block structure constitutes a subset of the second block structure; and
    using the modified second block structure to encode the image in the image sequence, wherein
    the sub-blocks have characteristics which are analyzed to determine differences,
    only the sub-blocks of the second block structure whose block size is at least a definable threshold value are transferred into the modified second block structure, and
    the threshold value is defined such that the threshold value represents a ratio between the block size of one sub-block of the second block structure and the block size contained in a region of the first block structure, the threshold value being assigned to the smallest sub-block of the region of the first block structure.

8. A method for encoding video having an image sequence whereby images in the image sequence are encoded in a scaled manner such that resulting encoded video contains data which ensures representation of the images in a plurality of different levels of image resolution defined by a number of pixels per image representation, the method comprising:

temporarily creating a first block structure for a first resolution level and a second block structure for a second resolution level, whereby the first resolution level is lower than the second resolution level, the first and second block structures being created in a block-based manner such that, starting from one block, the block is subdivided into partial blocks and then sub-blocks to describe a motion possibility in the image sequence, the motion possibility being described by more finely subdividing areas of motion;

comparing the first block structure with the second block structure to determine structural differences including motion and texture between the first and second block structures;

creating a modified second block structure based on the structural differences, whereby the modified second block structure constitutes a subset of the second block structure; and using the modified second block structure to encode the image in the image sequence, wherein the modified second block structure of the second resolution level is used as a first block structure of a third resolution level, the second resolution level having a smaller number of pixels than the third resolution level.

9. A method for decoding an encoded image sequence, wherein a scalable representation of the image sequence is created based upon the second modified block structures contained in the image sequence that were created according to a method for encoding video whereby images in the image sequence are encoded in a scaled manner such that resulting encoded video contains data which ensures representation of the images in a plurality of different levels of image resolution defined by a number of pixels per image representation, the method comprising: temporarily creating a second block structure for a second resolution level, whereby the second resolution level is higher than a first resolution level, the second block structure being created in a block-based manner by a process comprising:

starting from one block, the block is subdivided into partial blocks and then sub-blocks;

time-predicting the second block structure to produce a predicted block structure, the second block structure being time-predicted based on at least one other image in the image sequence;

determining errors in the predicted block structure; and excluding from the second block structure information not relating to the errors in the predicted block structure;

comparing the second block structure with a first block structure corresponding to the first resolution level, the first and second block structures being compared to:

recognize further block structure divisions included the second block structure but not the first block structure; and determine the sizes of the further block structure divisions;

creating a modified second block structure by eliminating from the second block structure all further block structure divisions larger than a predefined threshold value whereby the modified second block structure constitutes a subset of the second block structure; and using the modified second block structure to encode the image in the image sequence.

10. A method for encoding video having an image sequence whereby images in the image sequence are encoded in a scaled manner such that resulting encoded video contains data which ensures representation of the images in a plurality of different levels of image resolution defined by a number of pixels per image representation, the method comprising:

temporarily creating a first block structure for a first resolution level and a second block structure for a second resolution level, whereby the first resolution level is lower than the second resolution level, the first and second block structures being created in a block-based manner such that, starting from one block, the block is subdivided into partial blocks and then sub-blocks to describe a motion possibility in the image sequence, the motion possibility being described by more finely subdividing areas of motion;

comparing the first block structure with the second block structure to determine whether sub-blocks in the second block structure are four times smaller than sub-blocks in the first block structure;

creating a modified second block structure by supplementing the first block structure to additionally include only the sub-blocks of the second block structure that are four times smaller than sub-blocks of the first block structure; and using the modified second block structure to encode and transmit the image in the image sequence.

11. An encoder for creating an encoded image sequence, whereby images in the image sequence are encoded in a scaled manner such that resulting encoded video contains data which ensures representation of the images in a plurality of different levels of image resolution defined by a number of pixels per image representation, the encoder comprising:

means for temporarily creating a second block structure for a second resolution level, whereby the second resolution level is higher than a first resolution level, the second block structure being created in a block-based manner by a process comprising:

starting from one block, the block is subdivided into partial blocks and then sub-blocks;

time-predicting the second block structure to produce a predicted block structure, the second block structure being time-predicted based on at least one other image in the image sequence;

determining errors in the predicted block structure; and excluding from the second block structure information not relating to the errors in the predicted block structure;

means for comparing the second block structure with a first block structure corresponding to the first resolution level, the first and second block structures being compared to:

recognize further block structure divisions included the second block structure but not the first block; and determine the sizes of the further block structure divisions;

means for creating a modified second block structure by eliminating from the second block structure all further block structure divisions larger than a predefined threshold value whereby the modified second block structure constitutes a subset of the second block structure; and means for using the modified second block structure to encode the image in the image sequence.

* * * * *